UNITED STATES PATENT OFFICE.

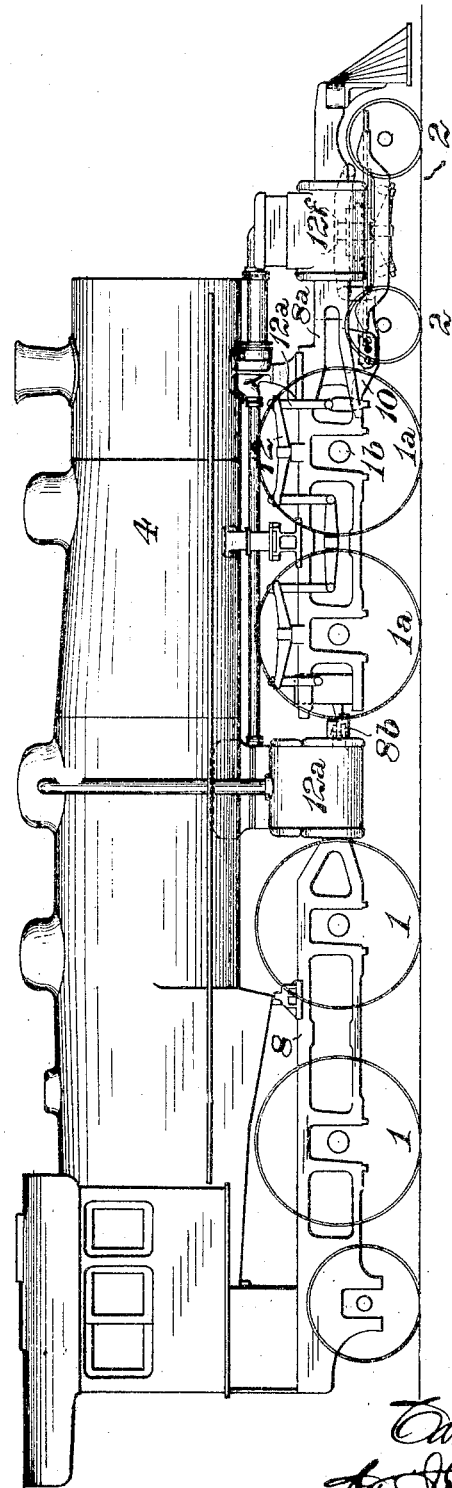

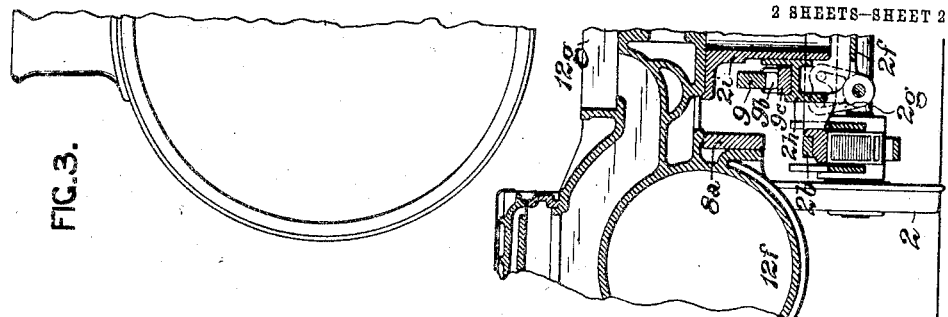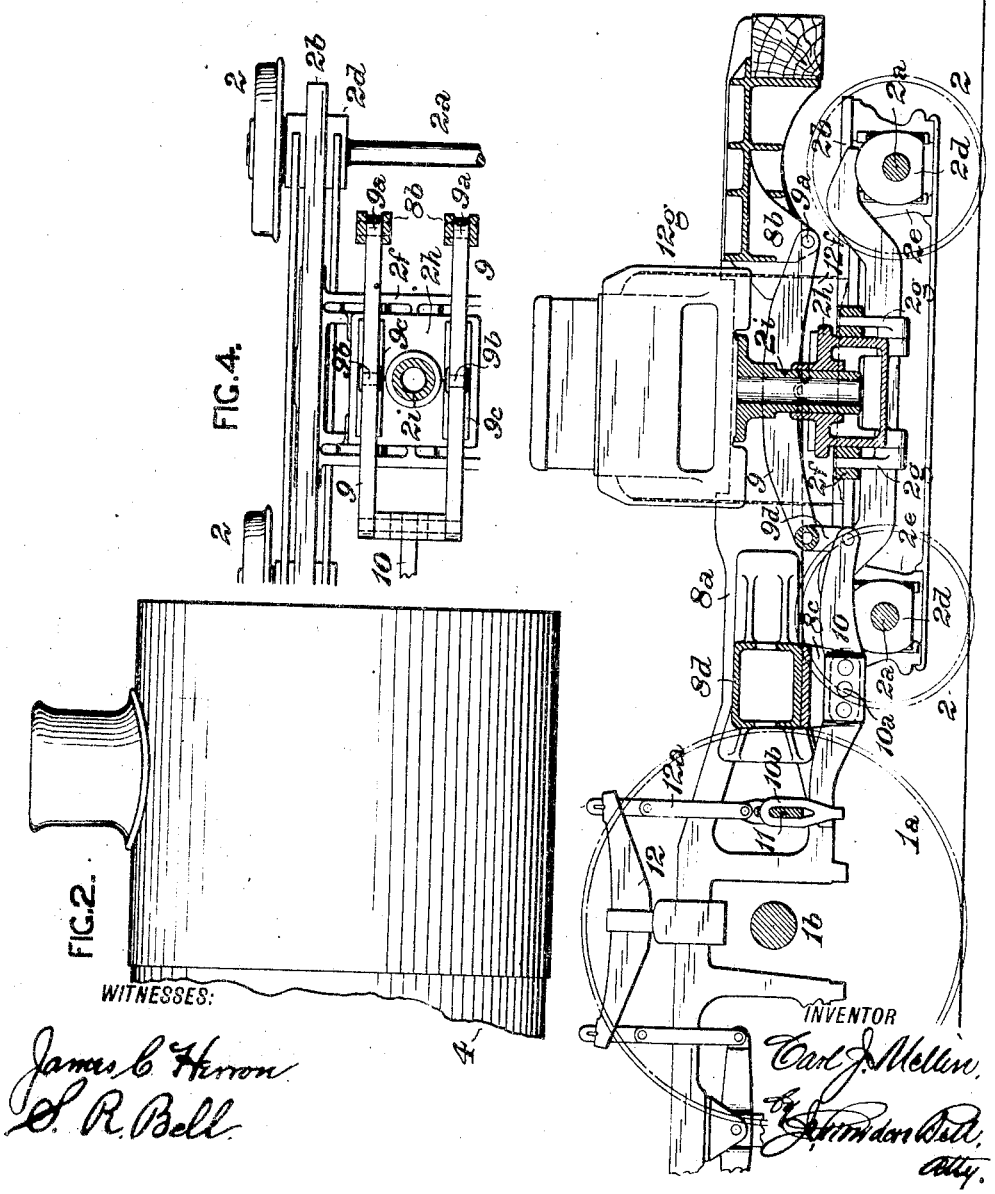

CARL J. MELLIN, OF SCHENECTADY, NEW YORK.

ARTICULATED LOCOMOTIVE.

978,186.    Specification of Letters Patent.    Patented Dec. 13, 1910.

Application filed September 29, 1910. Serial No. 584,422.

*To all whom it may concern:*

Be it known that I, CARL J. MELLIN, of Schenectady, in the county of Schenectady and State of New York, have invented a certain new and useful Improvement in Articulated Locomotives, of which improvement the following is a specification.

My invention, while specially designed for, and relating more particularly to, articulated locomotives designed for passenger service, is also adaptable in those of ordinary types, and its object is to provide means for a more uniform support of the locomotive upon bearing points in front and in rear of the cylinders than has heretofore been afforded.

The improvement claimed is hereinafter fully set forth.

In the accompanying drawings: Figure 1 is a diagrammatic side view of an articulated locomotive, illustrating an application of my invention; Fig. 2, a vertical longitudinal, central section, on an enlarged scale, through the truck; Fig. 3, a vertical, transverse section through the truck, and; Fig. 4, a partial plan view of the truck.

My invention is herein exemplified as applied in a locomotive engine of the Mallet articulated compound type, comprising a rear frame, 8, supported on a plurality of driving wheels, 1, and a front frame, 8ª, supported on a plurality of driving wheels, 1ª, and a four wheeled leading truck. The rear frame carries a pair of high pressure cylinders, 12ª, the pistons of which are coupled to crank pins on the driving wheels, 1, and the front frame carries a pair of low pressure cylinders, 12ᶠ, the pistons of which are coupled to crank pins on the driving wheels, 1ª. The boiler, 4, is fixed to the rear frame, 8, and the front and rear frames are coupled, in the longitudinal central plane of the locomotive, by a pivot pin, 8ᵇ, the forward portion of the boiler being thus, as is characteristic in locomotives of this type, free to swing or traverse laterally, relatively to the front frame, 8ª, in passing curves.

The leading truck proper may be of any suitable known construction, and is herein shown as comprising side frames, 2ᵇ, which are supported on two pair of truck wheels, 2, fixed on axles, 2ª, located in front and in rear, respectively, of the low pressure cylinders, 12ᶠ, and rotating in axle boxes, 2ᵈ, fitted, with the capacity of relative vertical movement, in pedestals, 2ᵉ, secured to the side frames. The two side frames are connected, midway between the axles, by a transom casting, 2ᶠ, which is coupled by swing links, 2ᵍ, to a center casting, 2ʰ, fitted to swivel about the axis of a vertical center pin, 2ⁱ, which is fixed at its top, to two abutting saddle members, 12ᵍ, cast integral with the low pressure cylinders, 12ᶠ, which are fixed to the front main frame members, 8ª.

The overhanging weight of the forward portion of the locomotive is transmitted from the front main frame to the truck frame and axles, and equalized, under a three point suspension, with a bearing on the forward driving axle, by a lever system, one form of which is herein shown as of substantially the following construction. Two equalizing levers, 9, are pivoted by pins, 9ª, at their forward ends, in advance of the transverse central plane of the truck, to lugs, 8ᵇ, depending from the front main frame members, 8ª. The levers, 9, are journaled in the central transverse plane of the truck, on rollers, 9ᵇ, fitting in bearing plates, 9ᶜ, on the top of the center casting, 2ʰ, and are coupled at their rear ends, by links, 9ᵈ, to an equalizing lever, 10, located in the longitudinal central plane of the truck, and pivoted by a pin, 10ª, to lugs, 8ᶜ, on the bottom of a cross brace, 8ᵈ, which connects the side members of the front main frame. The rear end of the equalizing lever, 10, is coupled, by a link, 10ᵇ, to the middle of a transverse beam, 11, the ends of which are, in turn, coupled to the forward end hangers, 12ª, of the springs, 12, of the front driving axle, 1ᵇ.

It will be seen that under the above described, or any mechanically equivalent construction, the supporting points of the weight of the front portion of the locomotive are located both in front and in rear of the cylinders, and that this weight is equalized with that on the front driving axle, with a three point suspension, there being two bearings on the truck frame and one on the beam connecting the opposite front driving spring hangers. The relative positions of the front equalizing levers, 9, and rear equalizing lever, 10, described and shown, are not essential, as, if desired, they may be reversely disposed, that is to say, there may be a single front and double rear equalizing levers. Further, the fulcrum pin of the rear equalizing lever may be located farther forward, and said lever be extended to a bearing on the center casting of the truck, the front equalizing levers being in such case dispensed with.

As before stated, my improvement is more particularly designed for use in passenger locomotives of the articulated type, in which, owing to the disposition of weight on the truck and front driving axle, due to the relation of the forward cylinders and truck, to the boiler, it is of specially desirable applicability. It is not, however, limited to locomotives of this type, but may, without variation of structural or operative principle, be applied in locomotives of the ordinary construction.

I claim as my invention and desire to secure by Letters Patent:

1. In a locomotive engine, the combination of a main frame, cylinders secured thereto, a four wheeled leading truck adapted for swiveling movement relatively to the main frame, and an equalizing lever system by which the main frame is supported on the truck through bearing points in front and in rear, respectively, of the cylinders.

2. In a locomotive engine, the combination of a main frame, cylinders secured thereto, a driving wheel axle journaled therein and rotated by pistons in said cylinders, a four wheeled leading truck adapted for swiveling movement relatively to the main frame, an equalizing lever coupled to the main frame and bearing on the truck, and connections through which a portion of the weight on the equalizing lever is transmitted to the driving wheel axle.

3. In a locomotive engine, the combination of a main frame, cylinders secured thereto, a driving wheel axle journaled therein, a four wheeled leading truck adapted for swiveling movement relatively to the main frame, an equalizing lever system by which the main frame is supported on the truck through bearing points in front and in rear of the cylinders, and connections to said equalizing lever system, through which a portion of the weight on the main frame is transmitted to the driving wheel axle.

4. In a locomotive engine, the combination of a main frame, cylinders secured thereto, a four wheeled leading truck adapted for swiveling movement relatively to the main frame, and a three point suspension equalizing lever system by which the main frame is supported through bearing points in front and in rear, respectively, of the cylinders.

5. In a locomotive engine, the combination of a main frame, cylinders secured thereto, a four wheeled leading truck adapted for swiveling movement relatively to the main frame, and an equalizing lever system which is coupled to the main frame in front and in rear of the cylinders and bears on the truck intermediate its connections to the main frame.

6. In a locomotive engine, the combination of a main frame, cylinders secured thereto, a driving wheel axle journaled therein, a four wheeled leading truck adapted for swiveling movement relatively to the main frame, a three point suspension equalizing lever system by which the main frame is supported through bearing points in front and in rear of the cylinders, and connections to said equalizing lever system through which a portion of the weight on the main frame is transmitted to the driving wheel axle.

7. In a locomotive engine, the combination of a main frame, cylinders secured thereto, a four wheeled leading truck adapted for swiveling movement relatively to the main frame, an equalizing lever coupled to the main frame in front of the cylinders, and bearing, in rear of its connections to the main frame on the truck, and a second equalizing lever coupled to the rear of the first specified equalizing lever and to the main frame.

8. In a locomotive engine, the combination of a main frame, cylinders secured thereto, a driving wheel axle journaled therein, a four wheeled leading truck adapted for swiveling movement relatively to the main frame, an equalizing lever coupled to the main frame in front of the cylinders and bearing in rear of its connections to the main frame on the truck, a second equalizing lever coupled to the rear of the first specified equalizing lever and to the main frame, and connections to said second equalizing lever through which a portion of the weight on the main frame is transmitted to the driving wheel axle.

9. In a locomotive engine, the combination of a main frame, cylinders secured thereto, a driving wheel axle journaled therein, a four wheeled leading truck adapted for swiveling movement relatively to the main frame, two equalizing levers coupled to the main frame in front of the cylinders and bearing on the truck on opposite sides of its center pin, a central equalizing lever coupled to the rear ends of said two equalizing levers and bearing on the main frame, and a transverse beam coupled centrally to the rear end of said central equalizing lever and coupled, at its ends, to the spring hangers of the driving wheel axle.

CARL J. MELLIN.

Witnesses:
 CHAS. J. ROGERS,
 FRANK H. SAUTER.